United States Patent
Luo et al.

(10) Patent No.: US 7,558,202 B2
(45) Date of Patent: Jul. 7, 2009

(54) ESTIMATING AVAILABLE BANDWIDTH WITH MULTIPLE OVERLOADING STREAMS

(75) Inventors: Chong Luo, ShangHai (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 573 days.

(21) Appl. No.: 11/276,848

(22) Filed: Mar. 16, 2006

(65) Prior Publication Data

US 2007/0217448 A1 Sep. 20, 2007

(51) Int. Cl.
*H04L 1/00* (2006.01)
(52) U.S. Cl. .................. 370/232; 370/235; 370/468
(58) Field of Classification Search ............... 370/468, 370/241, 252, 229, 230, 232, 464, 645; 709/223, 709/224; 716/1, 17
See application file for complete search history.

(56) References Cited

U.S. PATENT DOCUMENTS

2004/0078460 A1* 4/2004 Valavi et al. ................ 709/224
2006/0193292 A1* 8/2006 Bansal et al. ............... 370/331
2006/0215572 A1* 9/2006 Padhye et al. .............. 370/252
2006/0242616 A1* 10/2006 Iotov .......................... 716/17

* cited by examiner

*Primary Examiner*—Ricky Ngo
*Assistant Examiner*—Paul Masur
(74) *Attorney, Agent, or Firm*—Lee & Hayes, PLLC (57) ABSTRACT

Systems and methods for estimating available bandwidth with multiple overloading streams are described. In one aspect, a set of packets are communicated by a probing sender to a receiver. The packets are sent at multiple sending rates. At least two of the sending rates result in multiple overloading streams of packets being sent to the receiver. The probing sender receives a set of queuing delay information from the receiver. The queuing delay information is based one-way delay measurements corresponding to receipt by the receiver of at least two pairs of successive packets of the packets. The probing sender estimates available bandwidth of the network based on the received queuing delay information and multiple sending rates associated with the multiple overloading streams of packets.

18 Claims, 5 Drawing Sheets

ESTIMATING AVAILABLE BANDWIDTH WITH MULTIPLE OVERLOADING STREAMS

BACKGROUND

Internet applications typically utilize bandwidth estimation operations to make intelligent bit rate and quality decisions when transmitting multimedia (text, video, audio, images, etc.) content. Examples of such applications include Internet content distribution, media streaming, multiparty conferencing, Internet gaming, etc. Despite numerous existing available bandwidth measurement techniques, such techniques are substantially limited in terms of one or more of robustness, accuracy, and non-intrusiveness.

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, systems and methods for estimating available bandwidth with multiple overloading streams are described. In one aspect, a set of packets are communicated by a probing sender to a receiver. The packets are sent at multiple sending rates. At least two of the sending rates result in multiple overloading streams of packets being sent to the receiver. The probing sender receives a set of queuing delay information from the receiver. The queuing delay information is based on one-way delay measurements corresponding to receipt by the receiver of at least two successive packets. The probing sender estimates available bandwidth of the network based on the received queuing delay information and multiple sending rates associated with the multiple overloading streams of packets.

BRIEF DESCRIPTION OF THE DRAWINGS

In the Figures, the left-most digit of a component reference number identifies the particular Figure in which the component first appears.

DETAILED DESCRIPTION

Overview

Systems and methods for estimating available bandwidth using multiple overloading streams are described. An overloading stream is a stream of packets sent to a receiver at a sending rate that is greater than a rate that can be managed without buffer overflows and/or causing increased one-way delays between receiver-receipt of successive packets in view of an estimated available bandwidth of a network. In view of this, the systems and methods implement a direct probing algorithm using packet trains to calculate available bandwidth from input rate and one-way packet delay (OWD) information. This is accomplished independent of any prior knowledge of tight link capacity. To substantially avoid buffer overflow resulting from such packet trains, the direct probing algorithm adjusts packet train length based on probing rates and estimated link capacities. To provide a basis, several aspects of network capacity and available bandwidth are now discussed.

Network Capacity

The bandwidth property of a network path is typically defined with two metrics: capacity and available bandwidth. For instance, consider a network path P as a sequence of first-come first-serve (FCFS) store-and-forward links $l_0, l_1, \ldots l_N$ that deliver data from the source to the destination. Suppose the bandwidth, or the maximal transmission rate, of link $l_i$ is $C_i$, then the capacity of the path is:

$$C_P = \min_{i=0,\ldots N} \{C_i\} \quad (1)$$

The capacity of a path is determined by the link with the minimal $C_i$, referred to as narrow link. There are numerous techniques to measure narrow link capacity. However, network capacity is growing at very fast speeds, with network capacity usually on the order of hundreds or thousands of Megabytes (typically far beyond the bandwidth that an application may use). In such scenarios, determination of available bandwidth which indicates how much bandwidth can actually be used by an application, has become of great interest.

Available Bandwidth

Measuring available network bandwidth is much more difficult than measuring network capacity. One reason for this is because available bandwidth is not a constant value, but rather, variable in that it changes with time. Given a starting time T and a duration $\Delta T$ available bandwidth of path P can be represented as follows:

$$A_P(T, \Delta T) = \min_{i=0,\ldots N} \frac{1}{\Delta T} \int_T^{T+\Delta T} C_i(1 - u_i(t))dt \quad (2)$$

where $u_i(t)=1$ if link $l_i$ is in use at time t, and $u_i(t)=0$ otherwise. As opposed to the narrow link, which defines capacity of a path, the link with the minimal spare bandwidth, referred to as tight link, defines the available bandwidth of the path.

Existing techniques estimate available bandwidth using a statistical model of the network path, or estimate the available bandwidth by iteratively probing the path with different rates. These two types of approaches are generally referred to as gap model and rate model techniques, respectively. The gap model technique evolved from a packet-pair methodology previously used to measure capacity. The gap model sends two probing packets in a short time interval $\Delta_{in}$ for queuing at a bottleneck (a narrow link in capacity measurement, or tight link in available bandwidth measurement). If there is only one bottleneck along the network path, each packet in the packet will arrive at a receiving device with the same spacing $\Delta_{out}$ as they left the bottleneck. One difference between the capacity measurement and available bandwidth measurement is that the former queues the packets back-to-back in the bottleneck, while the latter uses competing traffic between the respective packets in the packet pair.

The gap model assumes that tight link capacity is known prior to making available bandwidth determinations. With this assumption, available bandwidth can be determined by subtracting the cross traffic rate from the link capacity, as follows:

$$A_P = C_t - C_t \times \left( \frac{\Delta_{out} - \Delta_{in}}{\Delta_{in}} \right) \quad (3)$$

Among gap model techniques, it is often assumed that the tight link overlaps with the narrow link whose capacity can be estimated by some well established capacity measurement tools. However, tight link capacity is not always known a priority, especially in the real Internet environment.

The assumption that tight link capacity is known a priori is relaxed in the rate model, which determines the available bandwidth using a simple heuristic: the input rate of the probing traffic should be the same as the output rate unless it exceeds the available bandwidth of the path. To find the turning point where the output rate starts to be smaller than the input rate, methods in this category iteratively probe the network with various input rates. This is accomplished using either linear or binary search techniques. One limitation of rate model is that this model generally introduces too much network overhead, which typically results in network congestion.

Available bandwidth measurements can be carried out by either passive or active means. Passive measurement monitors routers and collects detailed performance statistics. Based on these pieces of information, available bandwidth is calculated during any time interval. The limitation of this approach is the request for special access privileges to all the routers along the path, which is usually not possible over the Internet. Active measurement, in contrast, does not rely on access to underlying hardware. The basic idea is to inject a sequence of probing packets at the sender and estimate the available bandwidth by analyzing the output at the receiver. Therefore, the active measurement technique can be divided into a probing phase and an analyzing phase.

Figure 1:
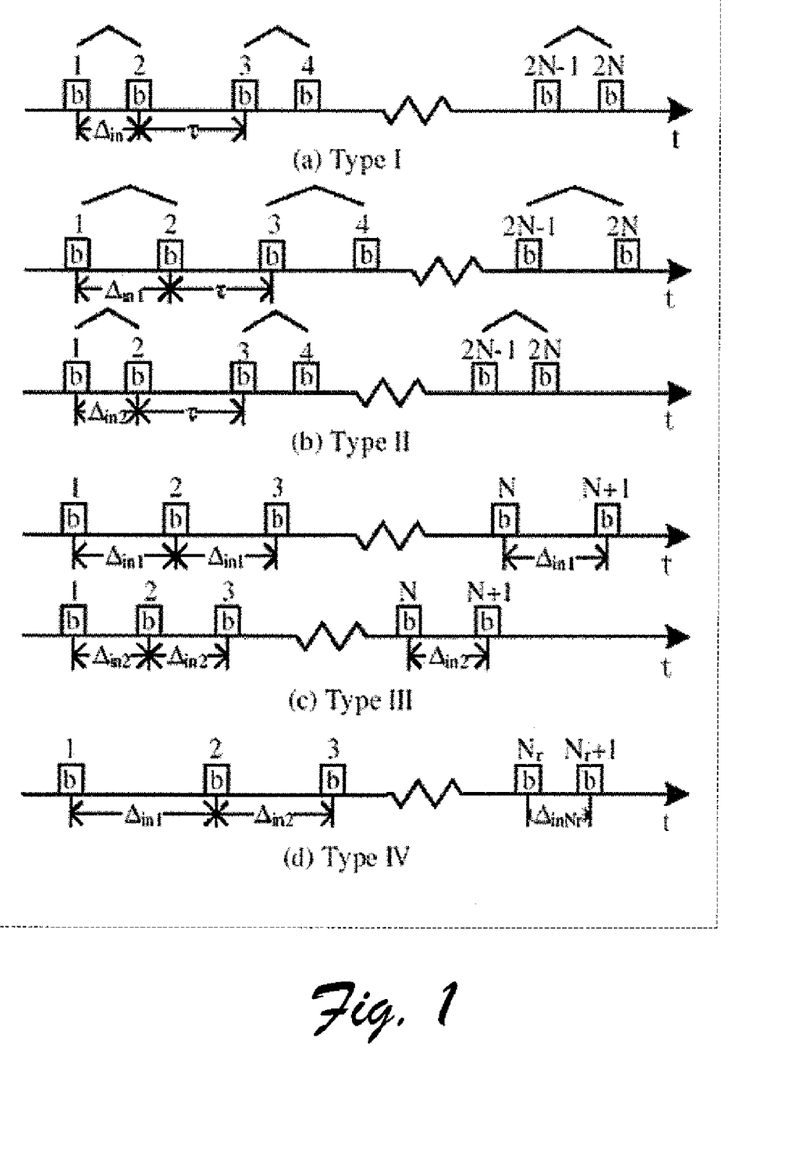
FIG. 1 shows four exemplary active measurement probing patterns to determine available network bandwidth.

Self-injected probing traffic usually takes form of packet pair, packet train, or packet chirp. FIG. 1 shows four exemplary active measurement probing patterns to determine available network bandwidth. Referring to FIG. 1, type I is the same as the traditional packet pairs used in capacity measurement. There are two parameters for this input: the intra-pair interval $\Delta_{in}$ and the inter-pair interval $\tau$. While the selection of $\tau$ is specific to each method, $\Delta_{in}$ is usually set to the transmission time of a probe packet on the bottleneck link. An exponentially distributed $\tau$, which results in a Poison sampling process, is commonly used. By choosing a large $\tau$, the probing overhead can be kept at a considerably low level, but at the expense of prolonged measurement times.

FIG. 1(b) shows active measurement probing pattern type II. Probing pattern type II is different from probing pattern type I (FIG. 1(a)) in that each measurement in probing pattern type II is composed of multiple probing sequences with different intra-packet intervals. By choosing different $\Delta_{in}$, the network is probed with different input rates. The measurement of each rate is the mean of N samples, which are collected by 2N packets. The number of probing rates is determined by the predefined measurement region $[o^{min}, o^{max}]$ and step $\Delta o$. Hence, there are $$2N \times \left\lceil \frac{o^{max} - o^{min}}{\Delta o} \right\rceil$$

packets for each measurement. This can be a substantially large amount of data and the measurement duration can be extremely long if the inter-pair interval is large enough to avoid congestion.

FIG. 1(c) shows active measurement probing pattern type III, which is an efficient technique to collect N samples for a specific probing rate. Probing pattern type III sends a packet train of N+1 packets. Compared to Type II, the number of packets required by Type III is reduced to $N_r(N+1)$, where $N_r$ is the number of rates to be probed. FIG. 1(d) shows active measurement probing pattern type IV, which is a sequence of exponentially spaced packets, known as "chirps". As FIG. 1(d) shows, a single chirp of $N_r+1$ packets is sufficient to probe $N_r$ rates. As there is only one sample for each probing rate, the stability of the measurement is greatly impaired. As a result, this use of this probing pattern requires a tradeoff between efficiency and robustness.

After injection of probing traffic (direct and iterative probing), resulting measurement data is analyzed (the analyzing phase). Though all the methods are intrinsically based on the same relationship between the input rate (gap) and the output rate (gap), the choice of the object being analyzed will affect the correctness and robustness of the algorithm. There are three types of objects for analysis in existing methods: (1) input and output gaps ($\Delta_{in}$ and $\Delta_{out}$) between two successive packets; (2) input rate $R_i$ and output rate $R_o$ of a probing stream; and, (3) relative one-way delays (OWD) or the queuing delays of a train of packets: $D_i = T_o - T_i$, where $T_i$ and $T_o$ are respective input and output times of a packet i. Referring to equation (3), most direct probing techniques implement analysis pattern type I. It is often used in combination with probing pattern type III, wherein probing traffic is a train of evenly spaced packets. Since $\Delta_{out}^k = T_o^{k+1} - T_o^k$, the average of $\Delta_{out}$ becomes:

$$\overline{\Delta_{out}} = \frac{T_o^{N+1} - T_o^1}{N} \quad (4)$$

In equation (4), only arrival times associated with the first and last packets are used.

Iterative probing methods to discover the turning point (where the output rate starts to be smaller than the input rate) by solving the linear equation $R_i/R_o = \alpha \beta R_i$ typically implement analysis patterns belonging to analysis pattern type II. Although the outcome of a probing sequence is a series of time stamps for N packet pairs (2N packets), only one $R_o$ value is calculated as follows:

$$R_o = \frac{1}{N} \sum_{k=1}^{n} \frac{b}{\Delta_{out}^k} = \frac{1}{N} \sum_{k=1}^{n} \frac{b}{T_o^{2k} - T_o^{2k-1}} \quad (5)$$

In systems that implement analysis patterns of type I and II, either $\Delta_{out}$ or $R_o$ are averaged among multiple measurements. The differences between successive measurements are either neglected or counteracted.

Analysis pattern type III is different than the previous two analysis pattern types in that this analysis pattern captures the relative OWD) for every single packet, and uses the whole series of $D_i$ for turning point (where the output rate starts to be smaller than the input rate) discovery. The difficulty of existing techniques that utilize this analysis pattern type, is that it is very difficult to extract useful information from a mass of OWD measurements, eliminate noise caused, for example, by network jitter, and maintain accuracy in face of buffer overflows.

The systems and methods for estimating available bandwidth using multiple overloading streams, which are discussed below in reference to FIGS. 2-6, address the above discussed and other limitations of conventional bandwidth estimation techniques.

An Exemplary System

Although not required, the systems and methods for estimating available bandwidth with multiple overloading streams are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 2:
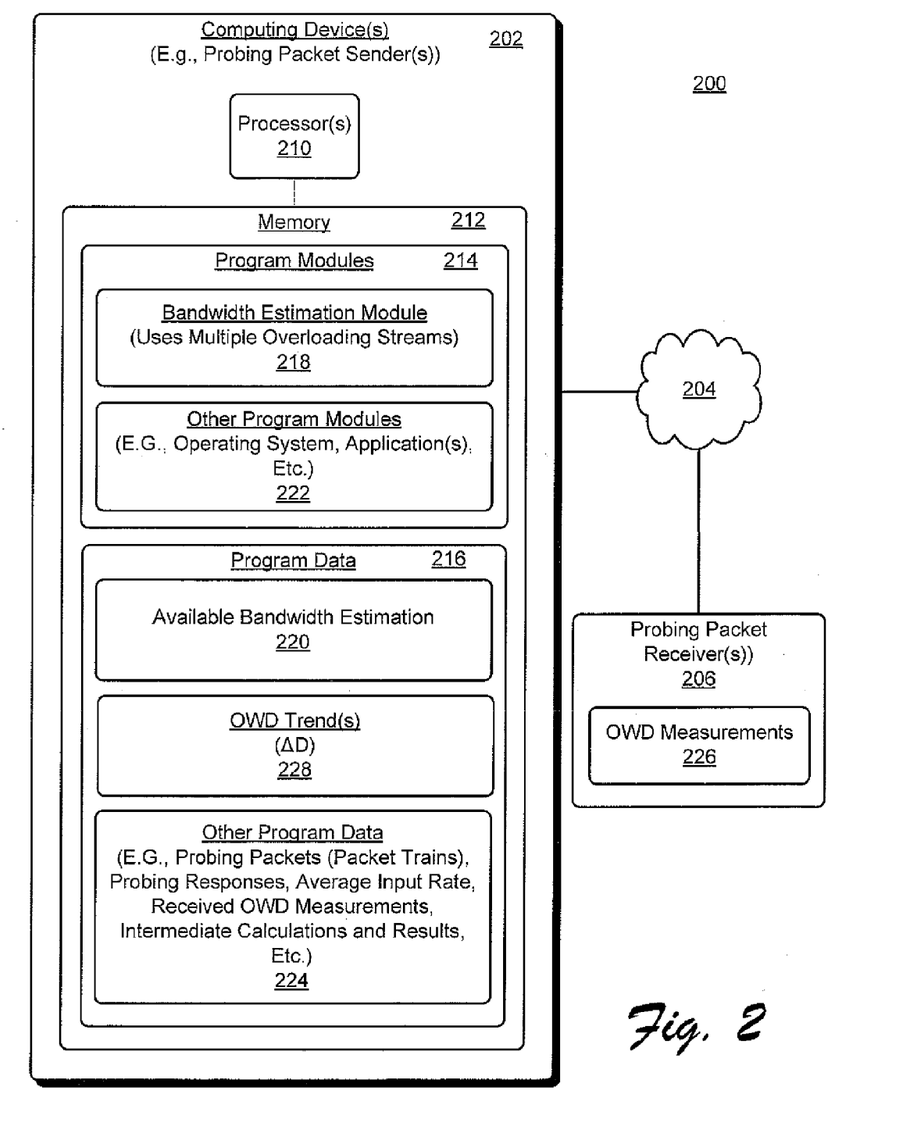
FIG. 2 illustrates an exemplary system for estimating available bandwidth with multiple overloading streams, according to one embodiment.

FIG. 2 shows an exemplary system 200 for estimating available bandwidth with multiple overloading streams, according to one embodiment. System 200 includes computing device(s) 202 (probing packet sender(s)) coupled across network 204 to any number of other computing devices such as probing packet receivers 206. Respective ones of computing devices 202 and 206 represent any type of computing device such as a server, a personal computer, a laptop, a handheld or mobile computing device, a small form factor device, etc. Although FIG. 2 shows probing packet sender(s) 202 and probing packet receivers 206 being independent of one another, this is an exemplary illustration for purposes of description. In one implementation a single computing device 202 or 206 can perform the following discussed operations associated with one or more of the other devices.

Computing devices 202 and 206 include one or more processing units coupled to system memory comprising computer-program modules and program data. A processing unit fetches and executes computer-program instructions from respective ones of program modules in the system memory. For example, computing device 202 includes one or more processing units 210 coupled to system memory 212 (e.g., RAM and ROM). System memory 212 includes computer-program modules ("program modules") 214 and program data 216. Processor(s) 210 fetch and execute computer-program instructions from respective ones of the program modules 214. Program modules 214 include, for example, bandwidth estimation model 218, which uses multiple overloading streams to generate available bandwidth estimation 220 for network 204. Program models 214 also include "other program modules" 222 such as an operating system, application(s) that leverage results of bandwidth estimation module 218, and/or so on.

More particularly, bandwidth estimation module 218 implements direct probing packet sender operations of computing device 202. To this end, bandwidth estimation model 218 periodically sends probing packet trains using multiple overloading stream packet input rates ($R_i$) to a probing packet receiver 206. Such packet trains are shown as respective portions of "other program data" 224. Bandwidth estimation model 218 sends these probing packet trains using probing pattern type III, as shown in FIG. 1(c). One reason for this is because use of a packet train is more efficient than use of packet pairs. Additionally, use of a packet train is more robust than chirps. One limitation of using a packet train is a high probing rate, which tends to cause buffer overflow at the tight link. To address this, bandwidth estimation module 218 implements a buffer control mechanism to adaptively adjust the packet train length according to the probing rate and the estimated link capacity, as discussed below.

Responsive to receiving these probing packet trains from a probing sender 202, a receiver 206 calculates one-way delay (OWD) measurements 226 for each received packets in view of sending rate information sent by the probing sender 202 to the receiver 206. OWD of a packet is the arrival time difference between this packet and the first packet in the train. Receiver 206 communicates these OWD measurements 226 to probing packet sender 202. In view of multiple OWD measurements 226 from the receiver 206 and multiple different probing packet sending rates ($R_i$) set by sender 202, bandwidth estimation model 218 calculates rates (trends) of relative OWD ($\Delta D$ 228) to determine if the relates OWD rates are increasing (please see equations (7) and (8) below). When the OWDs stabilize at a non-zero value and the trend stop increasing, it is likely that the receiving buffer at receiver 206 is full. (A zero (0) value is used in FIG. 4 to represent packet loss in FIG. 4. This is only for visualization purpose, as OWD of a loss packet cannot be calculated because there is no arrival time of this packet.)

Although the immediately preceding example illustrates that the receiver 206 calculates OWD measurements 226, in one implementation, the receiver 206 communicates packet arrival time difference(s) to the probing sender 202 so that the probing sender 202 can calculate the OWL) measurements 226. To accomplish this, receiver 206 would have at least a subset of the program models and program data already described with respect to probing sender 202. Thus, either the sender 202 or the receiver 206 can calculate available bandwidth.

In view of the OWD measurements 226, bandwidth estimation model 218 estimates available bandwidth 220 (please see equation (18) below). This is accomplished independent of any prior knowledge of the communication path between the probing sender 202 and a respective receiver 206, and independent of any prior knowledge of tight link capacity, and accomplished in a manner that substantially avoids overflow. In view of this bandwidth estimation 220, bandwidth estimation module 218 adjusts packet train length based on probing rates and estimated link capacities, as discussed below with respect to equations (11) and (12), to substantially avoid buffer overflow at the receiver 206.

These and other aspects of system 200 are now described in greater detail in the following sections.

Single-Link Model

Starting from a single-link model with fluid competing traffic of a constant rate. Let C be the capacity of that link and $R_c$ be the rate of the competing traffic, then the available bandwidth of the link is $A=C-R_c>0$. In the real Internet, this single-link model can be applied to any paths with only one tight link, The working condition of the direct probing technique is that the intra-packet interval $\Delta_{in}$ is small enough so that $b/\Delta_{in} > A$, where b is the size of the packet. When a probing train is used, the interval between all the successive packets are the same, therefore, $R_i = b/\Delta_{in} > A$. Now, consider the situation when a probing train of rate $R_i$ is injected into a single-link path with available bandwidth A, and $R_i > A$. Given a fixed packet size b, $\Delta_{in}$ can be determined by: $\Delta_{in} = b/R_i$. Under the fluid assumption, the competing traffic arrived at the tight link during the time interval of $\Delta_{in}$ is $R_c \Delta_{in}$. Hence the total amount of the traffic arrived at the tight link during $\Delta_{in}$ is $b + R_c \Delta_{in}$. Recall that the maximal transmission speed of the tight link is C, since $b + R_c \Delta_{in} = (R_i + R_c)\Delta_{in} > C\Delta_{in}$, the extra traffic will be queued at the tight link, and the queue increases by $$\Delta q = (R_t - A)\Delta_{in} = b \cdot \frac{R_i - A}{R_i} \quad (6)$$

Therefore, the increase of OWD between two successive packets (OWD) trend(s) 228) can be calculated by the following equation:

$$\Delta D = \frac{\Delta q}{C} = \frac{b}{C} \frac{R_i - A}{R_t} \quad (7)$$

In this implementation, bandwidth estimation module 216 utilizes a fixed packet size b of 500B, although other packet sizes can be used. Since the input rate $R_i$ is set by the sender (computing device 202), and $\Delta D$ can be measured at the receiver, there are only two unknown variables A and C in this equation. Theoretically, these unknown variables can be solved with only two measurements with different $R_i$. Yet, if multiple measurements are available, bandwidth estimation model 218 further improves accuracy of the estimation 220 as follows:

$$\Delta D = \frac{b}{C} - \frac{b \cdot A}{C} \cdot \frac{1}{R_i} = \alpha - \beta \cdot \frac{1}{R_i} \quad (8)$$

As shown in Eq. (8), $\Delta D$ has a linear relationship with the reciprocal of the sending rate $R_i$. With multiple measurements of $(\Delta D, R_i)$, bandwidth estimation module first estimates $\alpha$ and $\beta$ with Least Squares Fitting (LSF), or another type of fitting algorithm (e.g., Maximal Likelihood Fitting, etc.). Then, bandwidth estimation module 112 estimates the available bandwidth 220 and the capacity of the tight link as follows:

$$A = \frac{\alpha}{\beta}, C = \frac{b}{\alpha} \quad (9)$$

Figure 3:
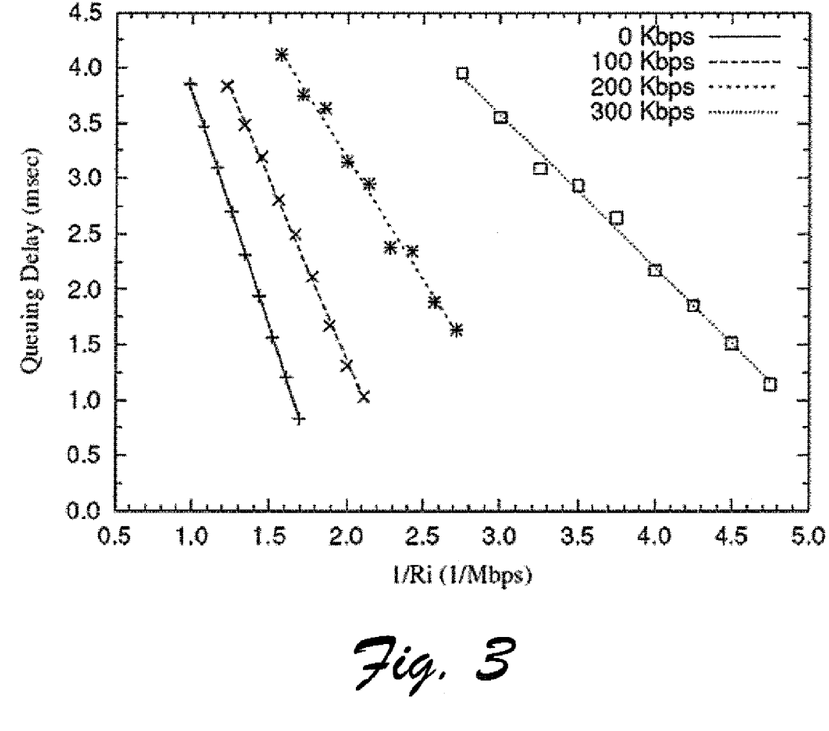
FIG. 3 shows an exemplary relationship between packet transmission input rates and queuing delays, according to one embodiment.

FIG. 3 shows an exemplary relationship between packet transmission input rates and queuing delays, according to one embodiment. In this example, the capacity of the measured link is approximately 560 Kbps. The four sets of results were gathered in view of the following amounts of cross traffic (from left to right): 0 Kbps, 100 Kbps, 200 Kbps, and 300 Kbps. As shown, the available bandwidth estimates (measurements) are very well fitted to a line as equation. (8) describes.

Probing Phase Control

For packet-pair probing traffic, bandwidth estimation model 218 determines average input rate by both the intra-packet interval and the inter-packet interval:

$$R_t = \frac{2b}{\Delta_{in} + \tau} \quad (10)$$

Although $\Delta_{in}$ is very small, the probing rate can still be kept low if a large $\tau$ is used. However, for packet train probing, $R_i$ is solely determined by $\Delta_{in}$ which is small enough to cause buffer overflow.

Figure 4:
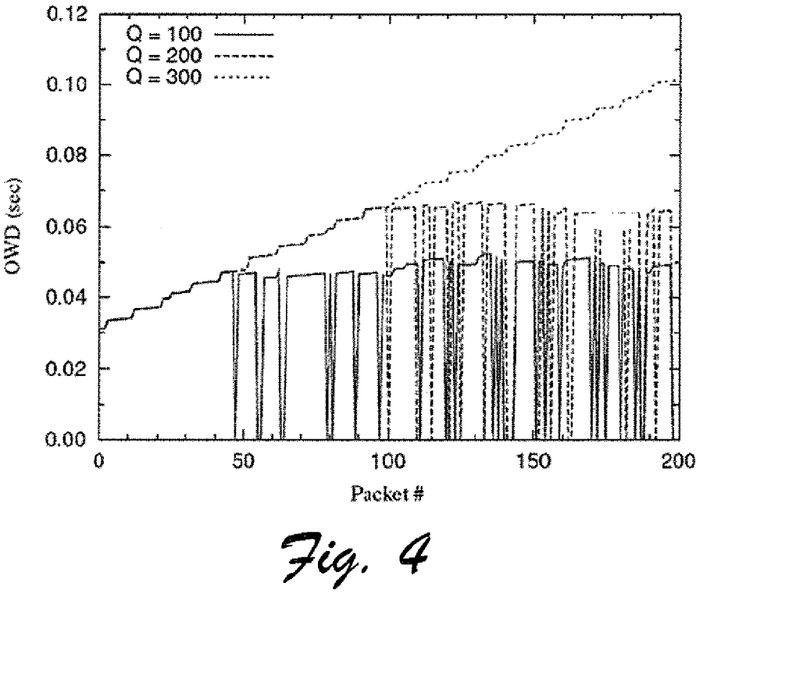
FIG. 4 shows exemplary relative one-way delay changes that result from buffer overflow under different queue sizes, according to one embodiment.

FIG. 4 shows exemplary one-way delay changes that result from buffer overflow under different queue sizes, according to one embodiment. As FIG. 4 illustrates, three sets of data are collected under different queue sizes. All the other settings including link capacity, available bandwidth, and input rate remain the same during the three example runs. The turning point where the OWD stops increasing, indicating that the buffer is full, and the zero value of OWD implies a loss packet. Buffer overflow is harmful as it affects the OWD measurements, therefore impairs the accuracy of the available bandwidth estimation.

Figure 5:
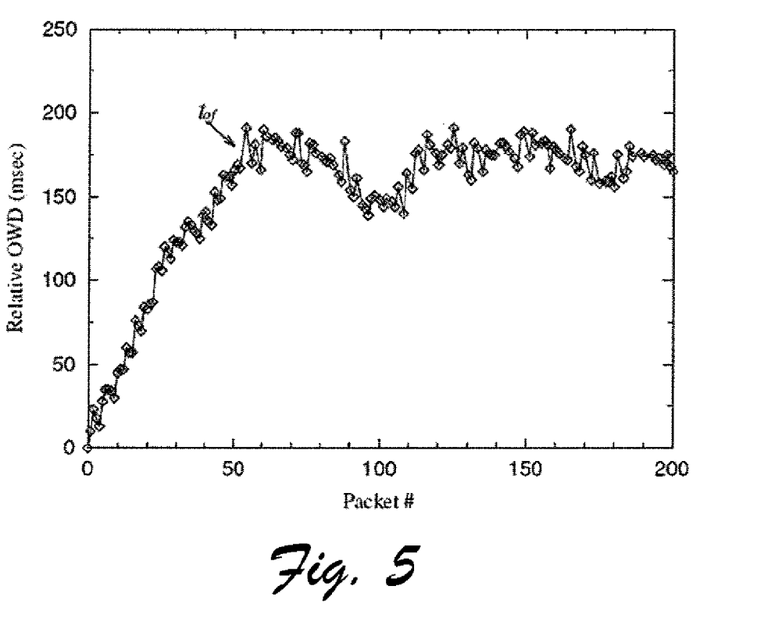
FIG. 5 shows exemplary real one-way delay data when buffer overflow occurs, according to one embodiment.

FIG. 5 shows exemplary real one-way delay data when buffer overflow occurs, according to one embodiment.

Buffer overflow may also lead to packet losses from competing traffic. A good available bandwidth measurement technique should be non-intrusive, avoiding unrecoverable impact to the competing traffic during the measurement. Using multiple overloading streams, bandwidth estimation module 216 achieves this by adjusting the packet train length based on the input rate and the historical information of link capacity and available bandwidth. More particularly, let C and B be the capacity and the buffer size of tight link P. The maximal queuing delay occurs when the buffer is full: $D_{max} = B/C$. When we probe this link with a rate $R_i$, which is larger than the available bandwidth A, the traffic that gets queued during time interval t is $(R_i - A) \cdot t$. Assume that the buffer is empty before the measurement, and that the packets are dropped using the drop-tail strategy, the maximal time that the probing traffic may last is:

$$T_{max} = \frac{D_{max} \cdot C}{R_i - A} \quad (11)$$

Therefore, with the historical $D_{max}$ information and the previous estimation of C and A, we can estimate the maximal number of packets $N_{max}$ that the sender can inject with rate $R_i$:

$$N_{max} = \left\lfloor \frac{D_{max} \cdot C \cdot R_i}{b(R_i - A)} \right\rfloor \quad (12)$$

In: this implementation, bandwidth estimation module 216 uses a packet train length with a minimum of 100 and $N_{max}$.

Queuing Delay Estimation

Using multiple overloading streams, bandwidth estimation module 216 estimates the available bandwidth 120 with two or more $(\Delta D, R_i)$ measurements. As $R_i$ is determined by the sender, $\Delta D$ becomes the only parameter that needs to be measured. Since packet train is used in our algorithm, $\Delta D$ can be taken on as the increasing rate of the relative OWD. Bandwidth estimation module 216 applies the Least Median of Squares Fitting (LMS), or other type of fitting algorithm, to estimate the ΔD. The benefit of using LMS instead of piecewise average or Least Squares Fitting (LSF) is robustness. By using LMS, up to 50% outliners, which may be caused by network jitters or context switch in a receiving system, are eliminated.

In this implementation, bandwidth estimation module 216 is concerned with the relative OWD of the packets. In view of this, sender 202 and the receiver 206 system clocks need not to be synchronized.

Multiple Tight Links

Under the assumption of FCFS scheduling and random dropping policy of packets at buffer overflow, the methodology of bandwidth estimation module 216 remains valid in the presence of multiple tight links. In this subsection, proof is provided under the condition that the number of tight links $N_i$ equals to 2. The extension to the cases when $N_i > 2$ is straightforward.

Let link $l_u$ and $l_v$ be the only two tight links in path P, whose capacities are $C_u$ and $C_v$ respectively. Let A be the available bandwidth of these two paths, and there exists a positive number $\delta$ which satisfies $A+\delta < \min A_i$, $i \neq u,v$. Considering a probing stream of constant rate $R_i$ ($A < R_i < A+\delta$) sent from the sender to the receivers passing through the tight $l_u$ and then $I_v$. According to (8), when it leaves the first bottleneck $l_u$, the increased OWD between two successive packets is:

$$\Delta D_u = \frac{b}{C_u} - \frac{b \cdot A}{C_u} \cdot \frac{1}{R_i} \quad (13)$$

As $R_i$ is smaller than the available bandwidth of any other links along the path, the transmission rate of the probing train remains the same until it reaches the second bottleneck $I_v$. The input rate of $l_v$ is the output rate of link $l_u$:

$$R_{i_v} = R_{o_u} = C_u \cdot \frac{R_i}{R_i + (C_u - A)} \quad (14)$$

When the stream exits $l_v$, the OWD difference between two successive packets is further enlarged by $\Delta D_v$:

$$\Delta D_v = \frac{b}{C_v} - \frac{b \cdot A}{C_v} \cdot \frac{1}{R_{i_v}} \quad (15)$$

Substituting (14) into (15), we have:

$$\Delta D_v = \frac{C_u - A}{C_v} \cdot \left( \frac{b}{C_u} - \frac{b \cdot A}{C_u} \cdot \frac{1}{R_i} \right) \quad (16)$$

Therefore, the OWD difference observed at the receiver becomes:

$$\Delta D = \Delta D_u + \Delta D_v = c \cdot \frac{b}{C_u} - c \cdot \frac{b \cdot A}{C_u} \cdot \frac{1}{R_i} = \alpha - \beta \frac{1}{R_i} \quad (17)$$

where $c=1+(C_u-A)/C_v$. It is a constant as long as the capacity and the available bandwidth of both tight links do not change during the measurement. In view of this, the calculation of A ($A=\alpha/\beta$) is still correct since $\alpha$ and $\beta$ are increased by the same constant factor.

A Complete Solution

The multiple overloading streams operations implemented by bandwidth estimation model 216 are not only an available bandwidth measurement algorithm, but a complete solution that can be integrated into various network applications. Multiple overloading streams operations are composed of the iterative probing phase and the direct calculation phase.

Since a prior knowledge of network path between a sender 202 and a receiver 206 is not assumed or necessary, bandwidth estimation module 216 starts to probe the network 204 from an initial rate $R_{min}$, and doubles the probing rate in each iteration until R>A, which can be judged from an increasing trend of the OWD. In our implementation, $R_{min}$ is set to 200 Kbps, and the initial packet train length is set to 100. An increasing OWD trend is reported if $\Delta D > \delta$. In our implementation, $\delta = 50$ μs. Doubling the probing rate represents one exemplary embodiment of the algorithm. In another embodiment, the probing rate is increased and different ways. For instance, the probing rate can be increased by a fixed value, as a multiple of a parameter p which is larger than 1, and/or so on.

After the iterative probing phase, bandwidth estimation model 216 calculates obtain a rough estimation of the available bandwidth as:

$$Å = R/\sqrt{2} \quad (18)$$

As R>A and R/2<A, Å satisfies:

$$\frac{1}{\sqrt{2}} A < Å < \sqrt{2} A \quad (19)$$

Then, in the direct probing phase, bandwidth estimation model 216 sends four trains of probing packets with respective rates such that $1/R_i$ is evenly spaced. In this manner, the estimation of A can be equally sensitive to the measurement errors of the four sequences. At least two of the rates are selected such that they are greater than the actual available bandwidth, even in an extreme case where $A=\sqrt{2}Å$. In one implementation, the rates at which the trains of probing packets are communicated are 114% Å, 133% Å, 160% Å, and 200% Å respectively.

Given the frequency f, bandwidth estimation module 216 makes a measurement every 1/f seconds. Taking the fact that the available bandwidth does not change much during a short time interval, the measurement of the previous round can be looked on as the initial estimation of the next round: $Å_{n+1} = A_n$.

In the instance that $Å_{n+1} > 160\% A_n$, the four probing sequence may not provide enough information for solving equation (9). In such a case, if the OWD of the sequence with the maximal probing rate (R=200%Å) shows an increasing trend, bandwidth estimation model 216 attempts to solve the equation with a previous estimation of C. Otherwise, bandwidth estimation model 216 researches Å using an iterative process which is identical to that in the initial phase used to calculate a rough estimate of available bandwidth.

An Exemplary Procedure

Figure 6:
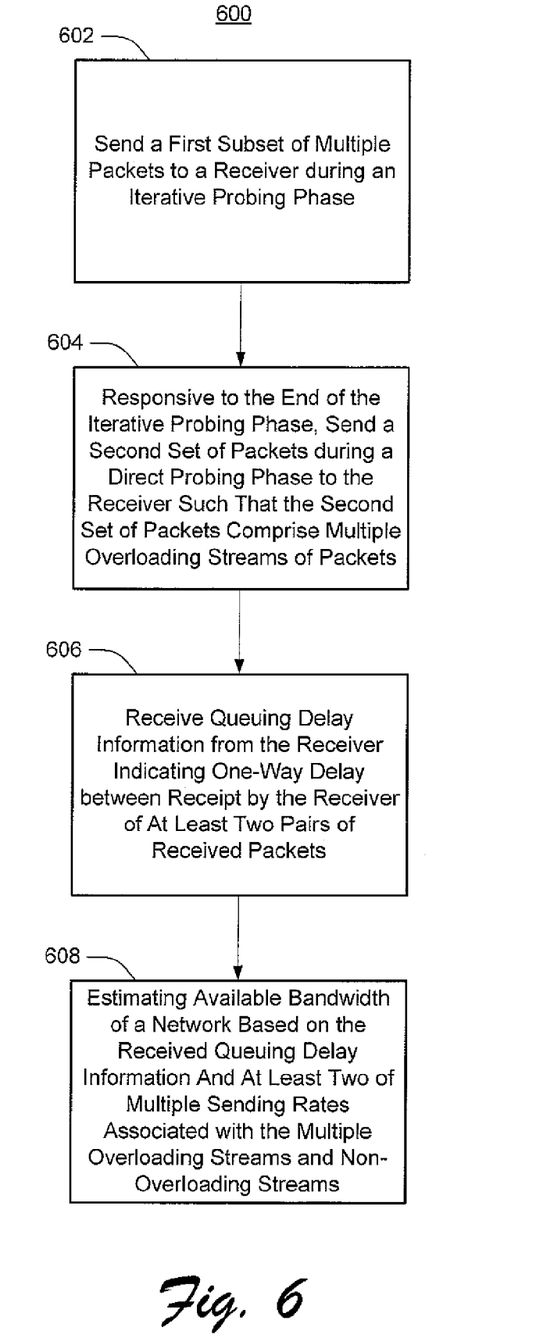
FIG. 6 shows an exemplary procedure for estimating available bandwidth with multiple overloading streams, according to one embodiment.

FIG. 6 shows an exemplary procedure 400 for estimating available bandwidth with multiple overloading streams, according to one embodiment, For purposes of exemplary illustration and description, the operations of the procedure are described with respect to components of FIG. 1.

At block 602, bandwidth estimation module 218 (FIG. 1) sends a first subset of multiple probing packets to a receiver 206 during an iterative probing phase. At block 604, responsive to the end of the iterative probing phase (determined in view of an increasing trend of one-way delays), bandwidth estimation model 218 sends a second set of probing packets during a direct probing phase to the receiver 206. At least a subset of the second set of probing packets are sent at rates that will generate multiple overloading streams with respect to the network (e.g., at a tight link) and/or the receiver 206 (e.g., buffer of overloads, etc.). At block 606, bandwidth estimation model 218 receives queuing delay information (OWD measurements 226) from the receiver 206. This queuing delay information indicates one-way delay of each received packets by the receiver 206. At block 608, bandwidth estimation model 218 estimates available bandwidth 220 of the network 204 based on the received queuing delay information and at least two of multiple sending rates associated with the multiple overloading streams and non-overloading streams. The non-overloading streams are sent at bit rates that are lower than the available bandwidth of the probing path.

CONCLUSION

Although the systems and methods for estimating available bandwidth with multiple overloading streams have been described in language specific to structural features and/or methodological operations or actions, it is understood that the implementations defined in the appended claims are not necessarily limited to the specific features or actions described. Rather, the specific features and operations of system 200 are disclosed as exemplary forms of implementing the claimed subject matter.

The invention claimed is:

1. A computer-implemented method for estimating available bandwidth on a network including one or more tight links, the method having computer instructions executable by a processor, comprising:

communicating a set of packets, by a probing sender, at multiple sending rates to a receiver, at least two of the sending rates resulting in multiple overloading streams of packets being sent to the receiver, wherein one or more packets comprise a packet train of an adjustable length;

receiving at the probing sender, a set of queuing delay information from the receiver, the queuing delay information being based on one-way delay measurements corresponding to a receipt by the receiver of at least two successive packets;

estimating available bandwidth of the network based on the queuing delay information and the multiple sending rates associated with at least two overloading streams of packets, wherein the estimating is independent of prior knowledge of tight link capacity; and adjusting a packet train length based on the probing to substantially avoid a buffer overflow at the receiver, wherein the packet train length is adjusted according to one or more sending rates and an estimated link capacity.

2. The method of claim 1, wherein the method further comprises providing the available bandwidth to a real-time communication application to allow the real-time communication application to make educated data transmission decisions.

3. The method of claim 1, wherein communicating the set of packets further comprises:

sending a first subset of the packets during an iterative probing phase; and responsive to an end of the iterative probing phase, sending a second set of the packets during a direct probing phase.

4. The method of claim 3, wherein the iterative probing phase comprises:

probing the network with a probing rate that is initially equal to a minimal probing rate $R_{min}$;

increasing the probing rate in each of multiple probing iterations until an increasing trend of one-way delay is detected from the queuing delay information; and calculating a rough estimation of available bandwidth based on a trend of one-way delays and at least two different probing rates associated with the multiple overloading streams.

5. The method of claim 4, wherein calculations to determine the trend of one-way delays are based on the following:

$$\Delta D = \frac{\Delta q}{C} = \frac{b}{C} \frac{R_i - A}{R_i}, \text{ or}$$

$$\Delta D = \frac{b}{C} - \frac{b \cdot A}{C} \cdot \frac{1}{R_i} = \alpha - \beta \cdot \frac{1}{R_i}; \text{ and}$$

wherein $\Delta q$ represents a rate of increase in size of a receiving buffer at the receiver, C represents an estimated data throughput capacity of a tight link on a path between the probing sender and the receiver, b represents size of a packet of the packets, $R_1$ represents a probing rate of multiple different probing rates, and A represents available bandwidth to be calculated.

6. The method of claim 3, wherein the direct probing phase comprises communicating at least four trains of probing packets of the packets to the receiver at evenly spaced sending rates, wherein at least two of the sending rates are greater than an estimation of available bandwidth determined during the iterative probing phase.

7. The method of claim 1, further comprising:

controlling how many packets are in a probing train based on: (1) a sending rate of the multiple sending rates, and (2) historical information indicating previously determined maximal queuing delays and network capacities; and wherein the probing train representing at least a subset of the packets.

8. The method of claim 7, wherein controlling how many packets are in a probing trade further comprises:

calculating a number of packets $N_{max}$ that a probing packet sender can send in a probing train to a receiver at a rate $R_i$ according to the following:

$$N_{max} = \left\lfloor \frac{D_{max} \cdot C \cdot R_i}{b(R_i - A)} \right\rfloor; \text{ and}$$

wherein C and B represent a previous capacity estimation and a buffer size of a tight link P, $D_{max} = B/C$ is a maximal queuing delay when a probe packet receiving buffer is full, A represents a previous available bandwidth estimation, and b represents a packet size.

9. A computer-readable memory medium comprising computer-program instructions for execution by a processor to estimate available bandwidth on a network that includes one or more tight links, the computer-program instructions comprising instructions for:
  sending across the network, by a probing sender, a first subset of multiple packets to a receiver during an iterative probing phase;
  responsive to an end of the iterative probing phase, sending a second set of the packets during a direct probing phase, the direct probing phase sending multiple overloading streams of packets to the receiver, wherein one or more packets comprise a packet train of an adjustable length;
  responsive to the iterative and the direct probing phases, receiving a set of queuing delay information from the receiver, the queuing delay information indicating one-way delay between a receipt by the receiver of at least three successive packets;
  estimating an available bandwidth of the network being based on the queuing delay information and at least two of multiple sending rates associated with the multiple overloading streams; and
  adjusting a packet train length based on the probing to substantially avoid a buffer overflow at the receiver, wherein the packet train length is adjusted according to one or more sending rates and an estimated link capacity.

10. The computer-readable memory medium of claim 9, wherein the computer-program instructions further comprise instructions for providing the available bandwidth to a real-time communication application to allow the real-time communication application to make educated data transmission decisions.

11. The computer-readable memory medium of claim 9, wherein the computer-program instructions for the direct probing phase comprise instructions for:
  communicating at least four trains of probing packets of the packets to the receiver at evenly spaced sending rates, wherein at least two of the sending rates are greater than an estimation of available bandwidth determined during the iterative probing phase; and
  iteratively performing the communicating at a particular frequency to estimate the available bandwidth in view of at least one previously estimated available bandwidth.

12. The computer-readable memory medium of claim 9, wherein the computer-program instructions for implementing the iterative probing phase comprise instructions for:
  probing the network from a probing rate of multiple different probing rates, the probing rate initially being equal to a minimal probing rate $R_{min}$;
  increasing the probing rate in each of multiple probing iterations until an increasing trend of one-way delay is detected from the queuing delay information; and
  calculating a rough estimation of available bandwidth based on the increasing trend of one-way delay and at least two different probing rates of the multiple probing rates.

13. The computer-readable memory medium of claim 12, wherein calculations to determine an increasing trend of one-way delay are based on the following:

$$\Delta D = \frac{\Delta q}{C} = \frac{b}{C} \frac{R_i - A}{R_i}, \text{ or}$$

$$\Delta D = \frac{b}{C} - \frac{b \cdot A}{C} \cdot \frac{1}{R_i} = \alpha - \beta \cdot \frac{1}{R_i}; \text{ and}$$

wherein $\Delta q$ represents a rate of increase in size of a receiving buffer at the receiver, C represents an estimated data throughput capacity of a tight link on a path between the probing sender and the receiver, b represents size of a packet of the packets, $R_i$ represents a probing rate of the multiple probing rates, and A represents a previous estimate of the available bandwidth.

14. The computer-readable memory medium of claim 9, further comprising:
  controlling how many packets are in a probing train based on: (1) a sending rate of multiple different sending rates, and (2) historical information indicating previously determined maximal queuing delays and network capacities; and
  wherein the probing train representing at least a subset of the packets.

15. The computer-readable memory medium of claim 14, wherein the computer-program instructions further comprise instructions for:
  calculating a number of packets $N_{max}$ that the probing sender can send to the receiver at a rate $R_i$ according to the following:

$$N_{max} = \left\lfloor \frac{D_{max} \cdot C \cdot R_i}{b(R_i - A)} \right\rfloor; \text{ and}$$

wherein C and B represent a previous capacity estimation and a buffer size of a tight link P, $D_{max}=B/C$ is a maximal queuing delay when a probe packet receiving buffer is full, A represents a previous available bandwidth estimation, and b represents a packet size.

16. The computer-readable memory medium of claim 14, wherein the computer-program instructions further comprise instructions for:
  calculating a maximal amount of time $T_{max}$ that probing traffic is sent by the probing sender to the receiver according to the following:

$$T_{max} = \frac{D_{max} \cdot C}{R_i - A}$$

wherein C and B represent previously estimated capacity and a buffer size of a tight link P, $D_{max}=B/C$ is historical information representing a maximal queuing delay when a probe packet receiving buffer is full, $R_i$ represents an average probe packet sending rate, and A represents a previously estimated available bandwidth.

17. A computing device comprising:
  means for sending multiple overloading streams of direct probing packets to a receiver over a network, wherein one or more packets comprise a packet train of an adjustable length;
  means for calculating available network bandwidth based on multiple measurements of probing packet sending rates and receiver queuing delays corresponding to a receipt by the receiver of respective pairs of packets from at least the multiple overloading streams of the probing packets; and
  means for adjusting a packet train length based on the probing to substantially avoid buffer overflow at the receiver, wherein the packet train length is adjusted according to one or more sending rates and an estimated link capacity.

18. The computing device of claim 17 further comprising means for calculating a maximal amount of time for the direct probing packet means to send probing packets to the receiver using at least the multiple overloading streams.

* * * * *